United States Patent [19]
Yoshida

[11] 4,313,108
[45] Jan. 26, 1982

[54] ELECTRIC APPARATUS FOR DISPLAYING A PLURALITY OF KEY SYMBOLS ON A SINGLE PASSIVE DISPLAY

[75] Inventor: Junichi Yoshida, Tachikawa, Japan

[73] Assignee: Casio Computer Co., Ltd., Tokyo, Japan

[21] Appl. No.: 100,053

[22] Filed: Dec. 4, 1979

[30] Foreign Application Priority Data

| Dec. 7, 1978 | [JP] | Japan | 53-152149 |
| Dec. 8, 1978 | [JP] | Japan | 53-152475 |
| Dec. 21, 1978 | [JP] | Japan | 53-157955 |
| Dec. 21, 1978 | [JP] | Japan | 53-157956 |
| Dec. 27, 1978 | [JP] | Japan | 53-161876 |

[51] Int. Cl.³ .......................... G06F 3/02; G09F 9/35
[52] U.S. Cl. ............................. 340/365 VL; 340/712; 350/331 R; 350/334
[58] Field of Search ........ 340/365 R, 365 VL, 365 S, 340/166 R, 711, 712; 364/200, 900, 705, 706, 709; 200/5 A, 310, 313, 317; 235/145 R; 350/334, 331 R; 178/17 C; 179/90 K; 400/479

[56] References Cited

U.S. PATENT DOCUMENTS

| 3,956,745 | 5/1976 | Ellis | 340/365 VL |
| 4,017,848 | 4/1977 | Tannas | 340/712 |
| 4,078,257 | 3/1978 | Bagley | 340/365 VL |

*Primary Examiner*—James J. Groody
*Attorney, Agent, or Firm*—Frishauf, Holtz, Goodman & Woodward

[57] ABSTRACT

An electric apparatus is adapted to display a plurality of key symbols on a single passive display. A keyboard includes a plurality of input keys for selectively inputting at least numeral data and function data and input keys operated to selectively display key symbols representing numerals, functions, etc. A single passive liquid crystal display is arranged below the keyboard. A plurality of electrodes are arranged on the predetermined areas of the single passive display and the key symbols corresponding to the functions are selectively displayed, by a key operation, on the electrodes.

7 Claims, 19 Drawing Figures

ELECTRIC APPARATUS FOR DISPLAYING A PLURALITY OF KEY SYMBOLS ON A SINGLE PASSIVE DISPLAY

The invention relates to an electrical apparatus having a single passive display for displaying a plurality of key symbols representing the functions of respective keys on a keyboard.

In a electronic calculator having, in addition to the usual arithmetic operations, other various functions, for example, a scientific calculation, a single input key is actuated to perform a plurality of functions and those functions are each designated selectively by a switch or a key. The symbols representing the functions are located near the single key with such functions on a board. Because of this designation corresponding to the key, the keyboard is complicated in appearance and hence an operator frequently becomes puzzled in selecting the switch or the key from the keys or distinguishing it from the remaining ones, thus leading to poor operability.

The trend is to make an electronic calculator which is minaturized and thinning. Thus, thinning has been required for the structure of the keyboard of the electronic calculator.

The recent progression of electronic technology has realized an electronic device with multi-function such as an electronic calculator with a clock function. In the case of such an electronic calculator, for example, when it is operated in the clock mode, ten keys and function keys for calculation are never used. Therefore, in such a multi-function device, those keys makes the keyboard complicated.

Accordingly, an object of the invention is to provide an electric apparatus including a keyboard having a plurality of input keys and which is capable of selectively performing two or more functions by one key operation and displaying a plurality of key symbols representing the functions of a key on a single passive display.

To achieve the above-mentioned object, there is provided an electric apparatus for displaying a plurality of key symbols on a single passive display, comprising a keyboard including a plurality of input keys for selectively inputting at least numeral data and function data and input keys operated to selectively display key symbols representing at least numerals and/or functions; a passive liquid crystal display disposed below the keyboard to display key symbols corresponding to the input keys, the passive display having two electrode substrates on which a plurality of electrodes are provided and between which a liquid layer is sealed, one of the two electrode substrates including electrodes provided on those areas of the keyboard corresponding to the plurality of input keys so that at least two key symbols are represented; a central processing unit electrically connected between the input keys on the keyboard and the passive display means to effect a predetermined calculation based on the numeral data and function data which are inputted by the operation of the input keys; and output means connected to the central processing unit to display a result of calculation obtained at the central processing unit.

With this construction, two or more key symbols are displayed on a single passive display by the operation of one of the keys associated with numeral data and function data. Therefore, a thin type electric apparatus can be attained in comparison with the prior art apparatus in which a plurality of passive displays are superposed for a corresponding number of functions.

When the keyboard of the invention is applied for a scientific calculator, only the key symbols relating to the function calculation may be displayed, so that the symbol of only the key to be operated is displayed and hence the operability of the device is improved.

BRIEF DESCRIPTION OF THE DRAWINGS

The above and other objects, features, and uses will become more apparent as the description proceeds, when considered with the accompanying drawings, in which.

DETAILED DESCRIPTION

Embodiments of the present invention will be described in detail referring to the drawings. In the description, a liquid crystal display, by way of example, will be used for a passive display to display the symbols representing functions.

Figure 1:
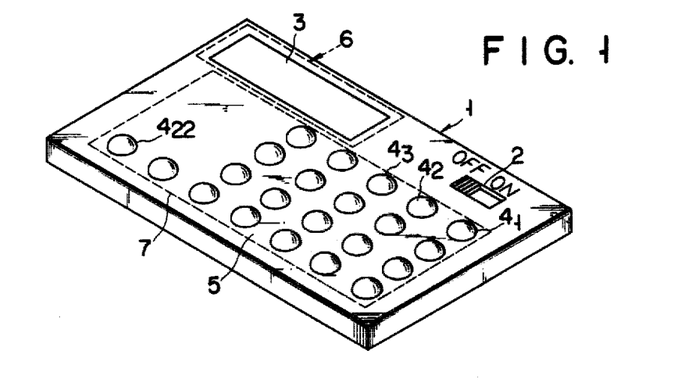
FIG. 1 is a perspective view of a scientific calculator as an embodiment of the invention.
Figure 2:
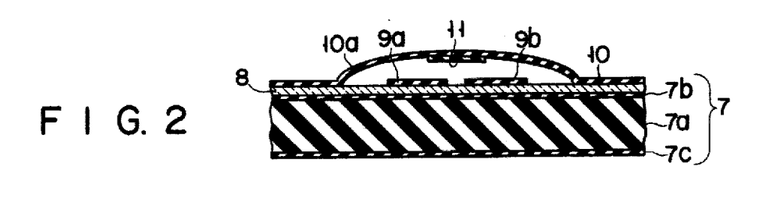
FIG. 2 illustrates in cross section the structure of an input key of the embodiment shown in FIG. 1.

A scientific calculator 1 shown in FIG. 1, has a power source switch 2, a display section 3, input keys $4_1$ and $4_2$ for changing function modes, and a keyboard section 5 including input keys $4_3$ to $4_{22}$ which are disposed in place on the front surface of the calculator. Disposed inside the function calculator, in a liquid crystal display unit 6 for data display and another liquid crystal display unit 7 for the key symbol display which are located corresponding to the display section 3 and the keyboard section 5. The liquid crystal display unit 6 has a plurality of digits having segment electrodes (not shown) arranged like a numeral 8 to display keyed-in data and the data of the operation result. The liquid display unit 7 has electrodes to display the symbols of the input keys, those electrodes being located at the input keys $4_1$ to $4_{22}$. The input keys $4_1$ to $4_{22}$ have each the structure as shown in FIG. 2. As shown, a liquid crystal cell $7a$ is sandwiched between two polarizers $7b$, $7c$. A transparent substrate 8 is layered on the liquid crystal display unit 7. A couple of transparent electrodes $9a$ and $9b$ are further layered on the transparent substrate 8. A transparent synthetic resin film 10 also formed on the transparent substrate 8 has a curved portion $10a$ like a semicircle which is outwardly curved above the transparent electrodes $9a$ and $9b$. The curved portion $10a$ has a transparent movable contact $10a$ at the central port on the inner surface thereof. In use, the semicircle portion $10a$ of the film 10 is depressed to make the movable contact 11 with the pair of the electrodes $9a$ and $9b$ thereby to effect the key-in operation. Since the members used in the key structure are all transparent as mentioned above, the symbols of the input keys displayed by the display unit 7 disposed therebelow can be seen through the input keys $4_1$ and $4_{22}$ from the exterior.

Figure 3:
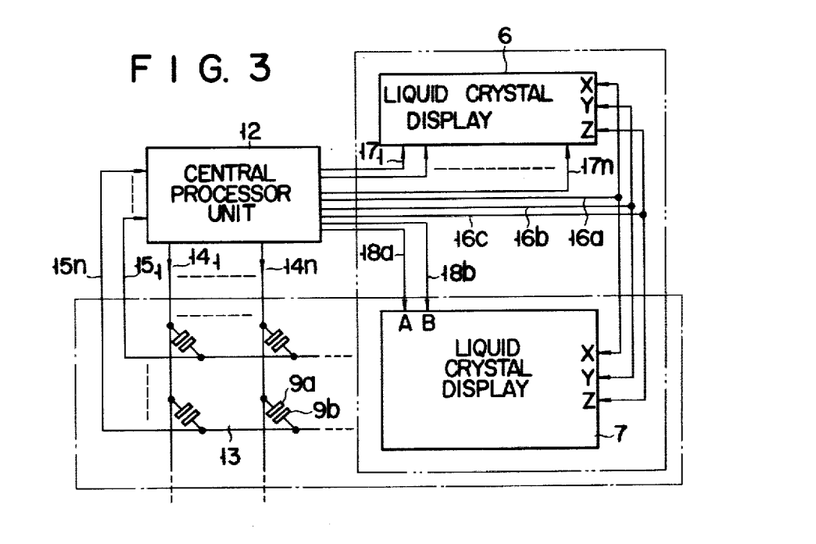
FIG. 3 is a block circuit diagram of the embodiment shown in FIG. 1.

Turning now to FIG. 3, there is shown a block diagram of the scientific calculator 1 as mentioned above. In the figure, reference numerals 6 and 7 designate the liquid crystal display units for data display and for displaying the symbols of the input keys and reference numeral 12 represents a central processor unit for performing operations, data storage and control. A key matrix 13 drives selected input and output lines selected from those lines $14_l$ to $14_n$ and $15_l$ to $15_n$ when one of the input keys $4_1$ to $4_{22}$ is actuated in the keyboard section 5. In FIG. 3, the display unit 7 for key symbol display and the key matrix 13 are separately illustrated for ease of illustration but actually the key matrix 13 is disposed on the display unit 7. In operation, the CPU 12 transfers a key sampling signal through the input lines $14_l$ to $14_n$ to the key matrix 13 at a given timing. Under this condition, when each input key $4_1$ to $4_{22}$ is operated, and the corresponding input and output lines $14_l$ to $14_n$ and $15_l$ to $15_n$ are energized, the key sampling signal is returned through the energized output line to the CPU 12 where it is judged which of the input keys is actuated on the keyboard section 1. The CPU 12 also applies drive signals X, Y, and Z through lines $16a$, $16b$, aand $16c$ to the display unit 6 for data display. When receiving display drive signals transferred through lines $17_l$ to $17_n$, the display unit 6 selectively drives the segment electrodes arranged like numeral 8 (not shown) to perform a given data display. Similarly, the CPU 12 applies the drive signals X, Y, and Z through lines $16a$ to $16c$ to the display unit 7 for the key symbol display. Under this condition, when the display drive signals A and B are applied through lines $18a$ and $18b$ to the display unit 7 at given timings, the display unit 7 selectively drives the electrodes to execute a given key symbol display.

Figure 4A:
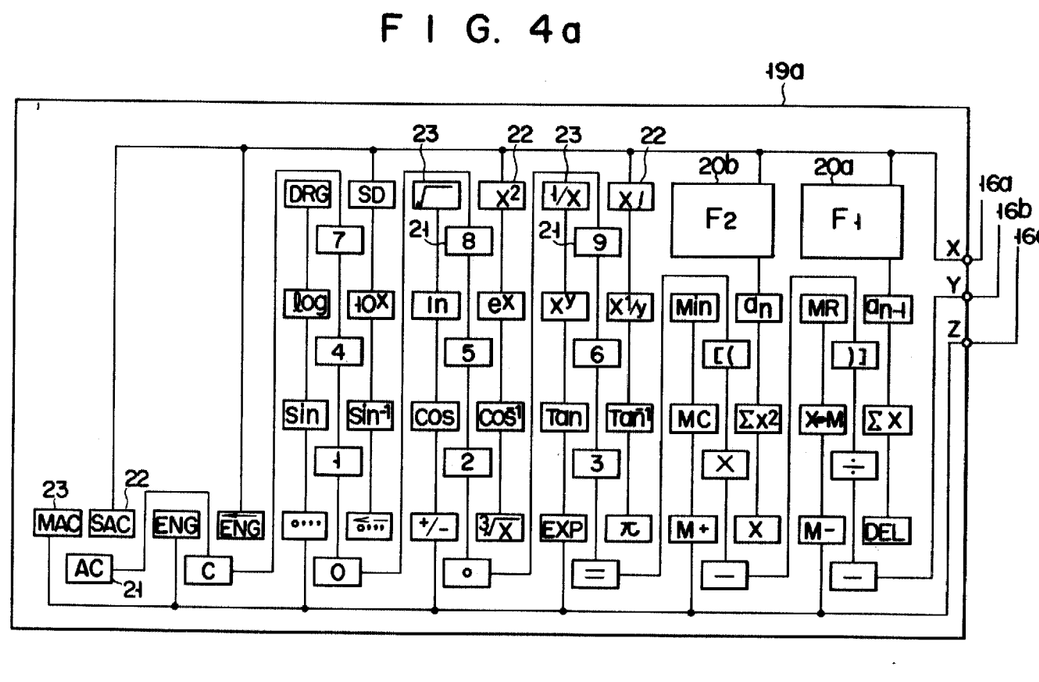
FIGS. 4(a) and 4(b) are an arrangement of electrodes of a liquid crystal display used as the embodiment shown in FIG. 1.
Figure 4B:
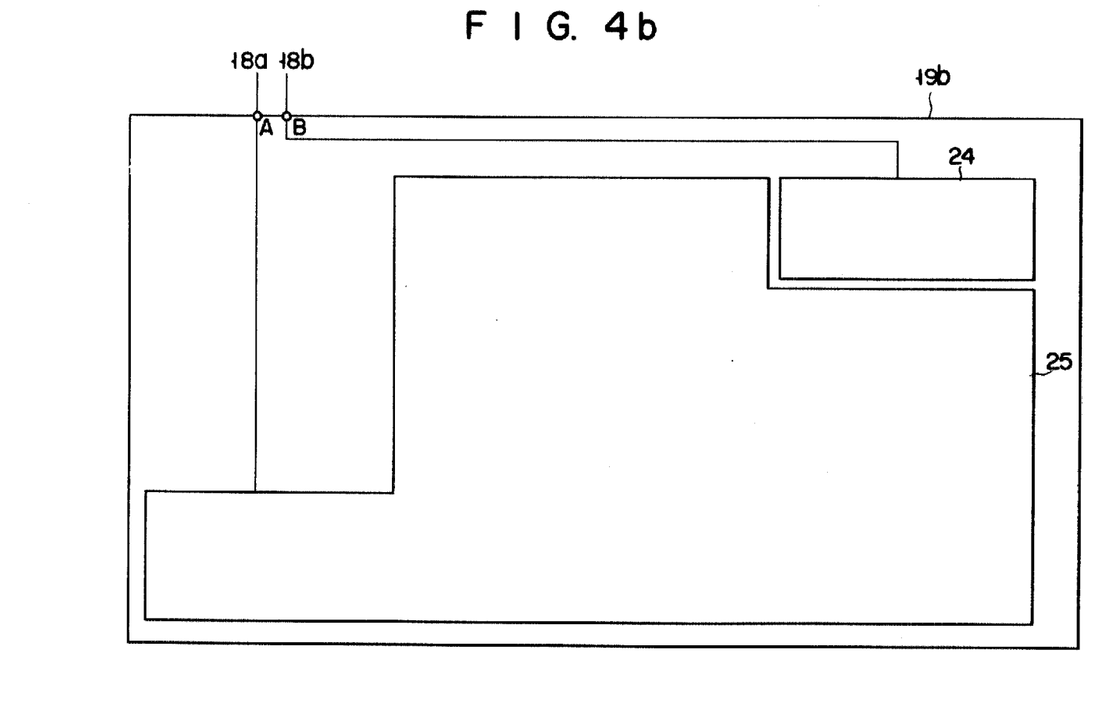

An arrangement of electrodes in the display unit 7 for displaying key symbols and its driving operation will be further described referring to FIGS. 4($a$) and 4($b$). In the figure, a pair of electrode substrates form the liquid crystal cell $7a$, the upper electrode substrate $19a$ being illustrated in FIG. 4($a$) and the lower electrode substrate $19b$ in FIG. 4($b$). On the upper electrode substrate $19a$, electrodes having the shapes or key symbols are formed at the positions corresponding to the input keys $4_1$ to $4_{22}$. As shown, electrodes $20a$ and $20b$ having shapes of the symbols "$F_1$" and "$F_2$" of the keys for changing modes are displayed at the positions of the input keys $4_1$ and $4_2$. Electrodes 21 having shapes of key symbols of the arithmetic operations are disposed at the central parts of the positions of the input keys $4_3$ to $4_{22}$. Electrodes 22 having the shapes of the key symbols for first function operations are each disposed on the upper right side of each position of the input key. The electrodes 23 having the shapes of the key symbols for second function operations are each disposed on the upper left side thereof. Of those electrodes, the electrodes 22 are connected to a line $16a$; the electrodes 21 to a line $16b$; the electrodes 23 to a line $16c$. On the lower electrode substrate $19b$, an electrode 24 having a shape to cover the electrodes $20a$ and $20b$ formed on the upper electrode substrate $19a$ is disposed corresponding to the latter electrodes. Similarly, an electrode 25 having a shape to cover the electrodes 21 to 23 is disposed on the lower electrode substrate $19b$, corresponding to the latter electrode. The electrode 24 is coupled with a line $18b$ and the electrode 25 to a line $18a$. The CPU 12 applies the drive signal to the electrodes $20a$ and $20b$ on the upper electrode substrate $19a$ and to the electrodes 21, 22, and 23, through the lines $16a$ to $16c$. At this time, if the display drive signal B is applied from the CPU 12 through the line $18b$ to the electrode 24 at the same timing as that of the drive signal X, the key symbols "$F_1$" and "$F_2$" for the mode changing are displayed at the positions of the input keys $4_1$ and $4_2$ in a time-divisional manner. When the CPU 12 applies the display drive signal A through the line 25 to the electrode $18a$ at the timing of the drive signal X, Y or Z, the key symbol is displayed at the positions of the input keys $4_3$ to $4_{22}$ in a time division manner.

In FIG. 4($a$), frames indicated by continuous lines enclosing numerals and key symbols are for the purpose of illustration only. Actually, each symbol of the key is wired. The electrode configurations in FIG. 4($b$) are illustrated as seen through the electrode substrate $19a$ from above and in fact the electrodes are formed at the lower side of the electrode substrate $19a$. Additionally, the electrodes in FIG. 4($b$) are so shaped as to prevent cross-talk between them and the wirings on the upper electrode substrate $19a$.

Figure 5A:
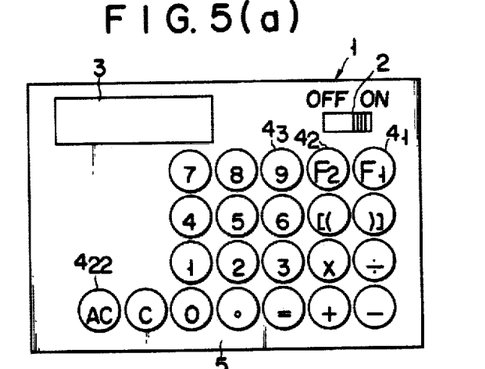
FIGS. 5(a) to 5(c) are diagrams useful in explaining the operation of the embodiment shown in FIG. 1.
Figure 5B:
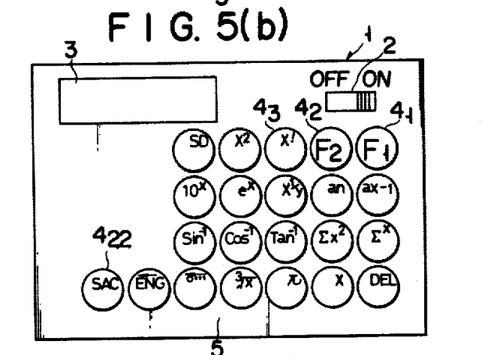
Figure 5C:
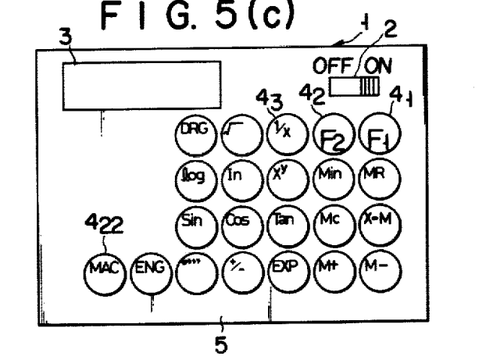

The operation of the keyboard thus constructed will be described referring to FIGS. 5($a$) to 5($c$). In the scientific calculator 1, none of the symbols names are displayed at the positions of the input keys $4_1$ to $4_{22}$ in the keyboard section 5 when the power source switch 2 is in its OFF condition. When the power source switch 2 is turned ON, the CPU 12 applies the drive signals X, Y, and Z through the lines $16a$ to $16c$ to the display unit 7 for the key symbol display. The drive signals are constantly applied thereto after the power source is turned on. Further, the display drive signal A is applied at the same timing as that of the drive signal Y, through the line $18a$ to the display unit 7 and the display drive signal B, is applied through the line $18b$ to the same at the same timing as that of the drive signal X. The key symbols for the arithmetic operation are displayed at the positions of the input keys $4_1$ to $4_{22}$, as shown in FIG. 5($a$). Specifically, the display is made by selectively driving the electrodes $20a$ and $20b$ and the electrodes 24 and 21 . . ., shown in FIGS. 4($a$) and 4($b$), by the CPU 12. In this case (including the cases of FIGS. 5($a$) and 5($c$)), the CPU 12 controls so that the input keys $4_1$ to $4_{22}$ function as indicated by the key symbols. Then, when the mode changing input key $4_1$ having the display of "$F_1$" is operated, a key sampling signal is transferred to the CPU 12 through one of the output lines $15_1$ to $15_n$ from the key matrix 13. Upon receipt of the key sampling signal, the CPU 12 detects the key operation by the input key $4_1$, and the CPU 12 transfers the display drive signals A and B at the same timing as that of the drive signal X through the lines 18a and 18b to the display unit 7. As a result, the key symbols of the first function operation are displayed at the positions $4_1$ to $4_{22}$, as shown in FIG. 5(b). In other words, the display is made by selectively during the electrodes 20a, 20b, 24, and 25 shown in FIGS. 4(a) and 4(b) by the CPU 12. Further, when the mode changing input key $4_2$ designated as $F_2$ is operated, the operation similar to that as mentioned above is made. Through this operation, the CPU 12 applies the display drive signal A at the time of the drive signal Z and the drive signal B at the timing of the drive signal X to the liquid display 7, through the lines 18a and 18b. As a result, the key symbols of the second function operation as shown in FIG. 5(c) are displayed at the positions of the input keys $4_1$ to $4_{22}$.

That is, the display is made by selectively driving the electrodes 20a, 20b, 24, 23 . . . and 25 by the CPU 12. Incidentally, if the mode changing input keys $4_1$ and $4_2$ are operated to display the names of the keys for the function operation and then a key for designating the desired function is depressed, the display unit returns to the display mode for the key names for th arithmetic operation shown in FIG. 5(a), through the operation similar to that mentioned above.

As described above, in the scientific calculator, when the power source switch 2 is OFF, none of the key symbols are displayed at the positions of the input keys $4_1$ to $4_{22}$. When the power source switch 2 is turned ON, the mode changing key symbols and the arithmetic operation key symbols are displayed at the positions of the input keys $4_1$ to $4_{22}$. Further, by operating the mode changing input keys $4_1$ and $4_2$, the key symbols of the function operations are displayed at the positions of the remaining input keys $4_3$ to $4_{22}$. In this way, when the keyboard of the invention is applied to a scientific calculator having a number of operating functions, only the key symbols of desired operating functions are displayed at the corresponding input key operations, so that an operator can easily recognize them distinctively, thereby improving the operability of the device.

The structure of each key having a transparent substrate, the transparent electrode and the transparent synthetic resin of the semicircle portion, as shown in FIG. 2 may be modified properly, if the key symbols can be clearly seen through the corresponding input keys from the outside.

The above-mentioned embodiment employs such an arrangement that the key symbols displayed by the liquid crystal display unit is observed through the input keys. The key symbols may be displayed near the corresponding keys of the keyboard. In this case it is not necessary to use transparent members for the input keys, but it is necessary to use windows through which the symbols of the input keys may be seen and which are disposed near the respective input keys.

Additionally, it is evident that the symbols of the input keys representing the operations of the scientific calculator are not limited to those used in the above-mentioned embodiment.

The liquid display unit which is employed to display the symbols of the keys in the above-mentioned embodiment may be replaced by any other suitable display means such as an electronic display.

The application of the keyboard of the invention, which is the scientific calculator in the above-mentioned embodiment, involves any type of electronic device with input keys of which the symbols are displayed by the passive display.

Figure 6:
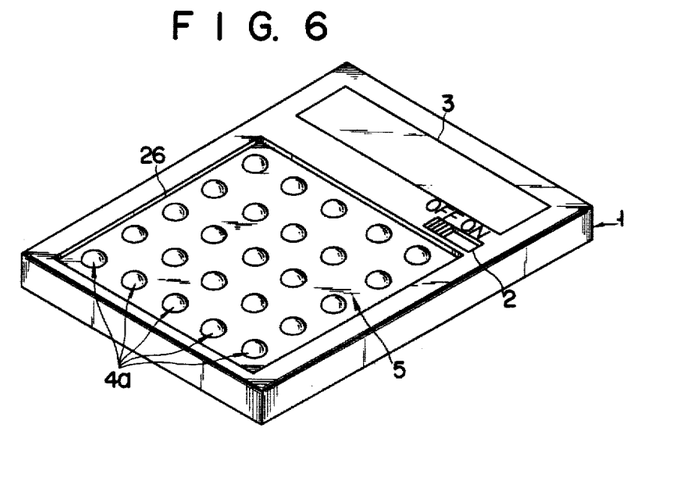
FIG. 6 is a perspective view of an electronic calculator as another embodiment of the invention.
Figure 7:
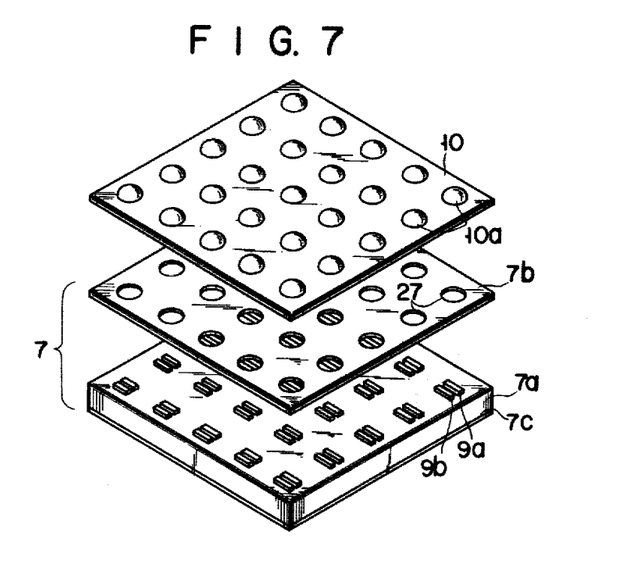
FIG. 7 is an exploded view of a keyboard used in the embodiment shown in FIG. 6.
Figure 8:
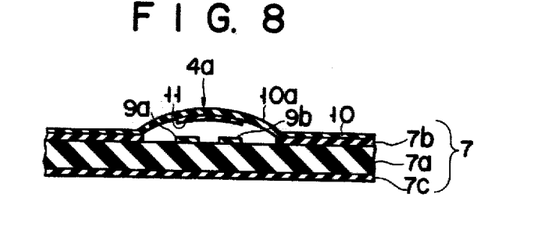
FIG. 8 illustrates in cross section the structure of a key of the embodiment shown in FIG. 6.

The explanation to follow is for the embodiment, particularly the structure of the keyboard. In FIG. 6 to be used for the explanation, like reference numerals are used to designate like or equivalent portions in the drawings used previously. In the figure, the electronic calculator 1 has a display section 3 visually providing the data displayed by the liquid display device for data display, and a rectangular large hole 26 with a size enough to expose almost the entire surface of a keyboard 4 having a power source switch 2 and a plurality of input keys 4a. As shown in FIG. 7, the display section and the rectangular hole are arranged in place on the surface of the calculator. A liquid display unit 7 has a structure including a couple of electrode substrates so arranged as to display given key symbols near the input keys 4a, and a liquid crystal unit subassembly having a liquid crystal cell 7a containing liquid crystal sealed therebetween sandwiched in between upper and lower polarizers 7b and 7c. A couple of transparent electrodes 9a and 9b as fixed contacts are formed at the positions on the surface of the liquid crystal cell 7a corresponding to the input keys 4a. Those pairs of the transparent electrodes 9a and 9b are wired to form a matrix, as a whole. Circular holes 27 arranged in the matrix are formed in the upper polarizer 7b to allow only the pairs of the transparent electrodes 9a and 9b to be exposed therethrough. A transparent synthetic resin 10 (to be layered on the upper polarizer 7b) has an arrangement of semicircle curved portions 10a corresponding to the arrangement of the pairs of the electrodes 9a and 9b. Each semicircle portion 10a curves outwardly above the corresponding pair of the electrodes 9a and 9b. The keyboard 5 is formed by layering the transparent synthetic resin 10 on the liquid display unit 7 for the key symbols display. Each input key 4a is in cross section illustrated as shown in FIG. 8. As well understood from the drawing of FIG. 8, the inut key 4a is comprised of the pair of transparent electrodes 9a and 9b and exposed through the window 27 of the upper polarizer 7b formed on the liquid crystal cell 7a, a semicircle portions 10a of the transparent synthetic resin 10, and the movable contacts each formed at the center of the inner side of the semicircle portion 10a. In operation, the semicircle portion 10a is depressed to come in contact with the pair of the fixed contacts 9a and 9b thereby to effect the keying-in operation.

By releasing the depressive force applied to the semicircle portion 10a, the depessed semicircle portion 10a is resiliently restored to its original shape.

In the above-mentioned embodiment, the pair of the transparent electrodes are directly formed on the liquid crystal cell 7a. A modification is possible in which the transparent electrodes are formed between the liquid crystal cell 7a and the upper polarizer 7b, with the transparent synthetic resin film.

In connection with the arrangement and configuration of the pair of the transparent electrodes 9a and 9b, those are not limited to the above-mentioned ones provided that those have an interval permitting electric conduction between the electrodes 9a and 9b when the semicircle portion 10a is depressed to make the movable contact with the electrodes 9a and 9b. It is evident that the shape of the window 27 formed in the upper polarizer 7b is not limited to that illustrated above. This is true for the shape of the semicircle portion 10a of the film 10.

The rectangular hole 26 in the above-mentioned embodiment is elongated longitudinally with a size allowing almost the entire surface of the keyboard section 5. Alternately, an arrangement of holes are formed in the surface of the calculator 1, each hole being shaped so as to allow only the semicircle portion 10a to be exposed. Further, transparent members are used or holes are formed at the portions to display the symbols of the keys.

In a modification of the structure, a simple structure is allowable in which the upper polarizer having through-holes to allow only the transparent electrodes to be exposed therethrough is merely layered on the liquid crystal cell having the transparent electrodes formed thereon as fixed electrodes. In use, a finger is made merely to come in contact with the transparent electrodes exposed for keying-in operation. That is to say, the structure of this modification is of the so called touch-key type. Only the necessity in the invention is that the keyboard is constructed by essentially using the liquid display unit including the liquid crystal cell with the transparent electrodes as the fixed electrodes and the upper polarizer with through-holes for exposing the transparent electrodes.

Another embodiment of the keyboard structure according to the invention will be described. In the explanation of the embodiment, like portions or equivalent portions are designated by like referene numerals used in the above-mentioned embodiment.

Figure 9:
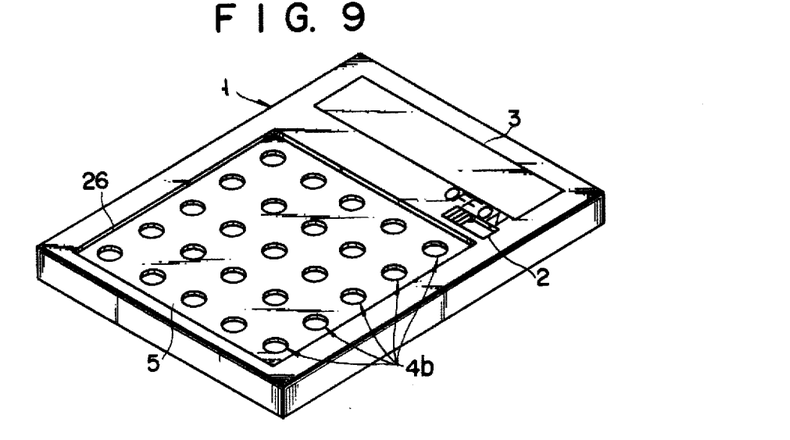
FIG. 9 is a perspective view illustrating the electronic calculator of still another embodiment of the invention.

A relatively large square hole 26 allowing the keyboard 5 to be exposed therethrough is formed in the upper surface of the electronic calculator 1, as shown in FIG. 9. In the keyboard 5 having a number of input keys 4b for keying in data, various numerals representing the key symbols of the input keys 4b for the arithmetic operations are displayed in the vicinity of the respective keys 4b by a liquid crystal display unit for key symbol display disposed under the keyboard 4.

Figure 10:
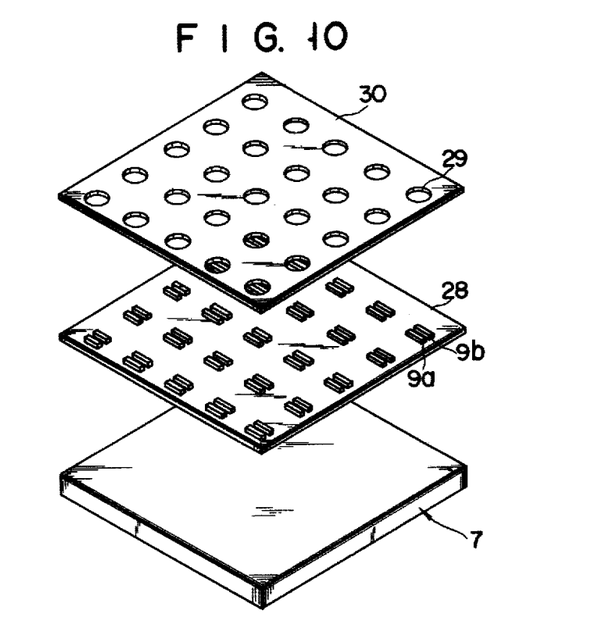
FIG. 10 is an exploded view of the keyboard used in the embodiment shown in FIG. 9.
Figure 11:
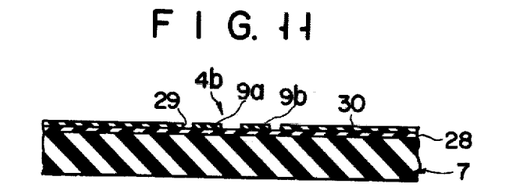
FIG. 11 illustrates a cross sectional view of an input key of the embodiment shown in FIG. 9.

In FIG. 10 illustrating the structure of the keyboard 5, reference numeral 7 designates the liquid crystal display unit for the key name display which has a liquid crystal sealed between a pair of electrodes properly arranged so as to display the key name with a pair of upper and lower polarizers sandwiching the liquid crystal sealed by the electrodes. A first transparent insulating sheet 28 has an arrangement of pairs of transparent electrodes 9a and 9b as fixed contacts disposed on the surface thereof. The arrangement of the pairs of the transparent electrodes 9a, 9b corresponds to that of the respective input keys $4_1$ to $4_{22}$. Although not illustrated, those pairs of the transparent electrodes 9a and 9b are wired to form a matrix. The keyboard 5 is formed in a manner that the first transparent insulating sheet 28 is layered on the liquid crystal display unit 7 and a second transparent insulating sheet 30 having circular key windows 29 each formed to allow the pair of the transparent electrodes 9a and 9b to be exposed therethrough, is further layered on the upper surface of the first insulating sheet 28. With this construction, each input key 4b has a longitudinal section as shown in FIG. 11. The pair of the transparent electrodes 9a and 9b formed in the first transparent insulating sheet 28 exposed through the key window 29 of the second transparent insulating sheet 30. Since the keyboard 5 is constructed by transparent members, the key symbols displayed by the liquid crystal display unit 7 disposed thereunder can be seen from exterior. In keying the input keys 4b in the keyboard 5, a finger or a conductive member is made to contact with the pair of the transparent electrodes 9a and 9b exposed through the windows 29 of the second insulating sheet 30.

In the above embodiment, the second transparent insulating sheet 30 is layered on the first one 28. As a modification of it, the remaining portions of the first transparent insulating sheet 28 except the transparent electrodes 9a and 9b may be coated directly with insulating material such as insulating paint. Only the necessity for this is that the portions of the transparent electrodes 9a and 9b on the first transparent insulating sheet 28 are exposed and the remaining part of the sheet 28 is formed by an insulating layer.

The above embodiment employs a couple of transparent electrodes formed in the first transparent insulating layer 28; however, a single transparent electrode may be used in place of them and for the keying-in operation, a finger is made to contact with the single electrode.

The rectangular hole 26 sized to allow almost the entire surface of the keyboard 4 to be exposed therethrough in the above embodiment may be substituted by an arrangement of holes formed in the surface of the calculator only at the positions where the input keys 4b are located, and transparent portions through which the key symbols are displayed. The shape of the key windows 29 formed in the second transparent insulating sheet 30 is not limited to the circular one. The window 29 may have any other shape, if it allows the transparent electrodes as the fixed contacts to be exposed therethrough.

A still another embodiment of the invention is which the keyboard of the invention is applied to a scientific calculator. In this embodiment, a passive display employed is a liquid crystal display unit. Like or equivalent portions are designated by like reference numerals used in the previous embodiments.

Figure 12:
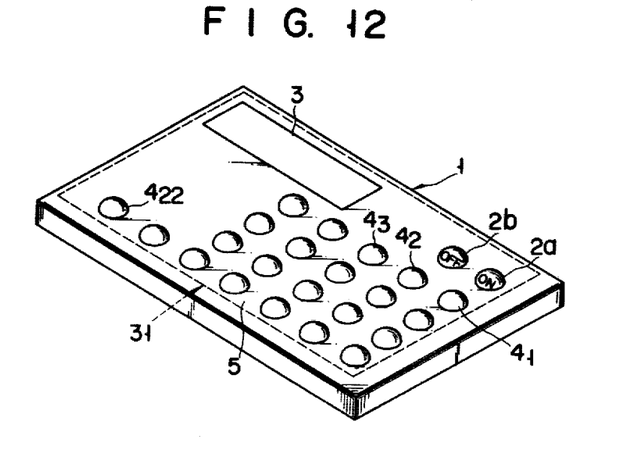
FIG. 12 is a perspective view of the scientific calculator as yet another embodiment of the invention.

A scientific calculator 1 shown in FIG. 12 has power source switches 2a and 2b, a display section 3, and a keyboard section 5 including input keys $4_1$ to $4_{22}$ which are disposed in place on the front surface of the calculator. Disposed inside the function calculator 1, is a liquid crystal display unit 31 large enough to cover almost the entire surface of the function calculator. Located at the position opposed to the above-mentioned display unit of the crystal display unit, are a plurality of digits having segment electrodes arranged like a numeral 8 to display keyed-in data and the data of the operation result. The liquid display unit 7 has electrodes arranged so as to display the symbol of the input keys at the position opposite to the input keys $4_1$ to $4_{22}$. The input keys $4_1$ to $4_{22}$, which are all transparent, are disposed on the surface of the crystal display unit 31, as mentioned in the previous embodiments. Therefore, the symbols of the input keys displayed by the display unit 7 disposed therebelow can be seen through the input keys $4_1$ to $4_{22}$ from exterior. Characters "ON" and "OFF" are printed on the positions of the power source keys 2a and 2b and are seen through the keys 2a and 2b from the outside.

Figure 13:
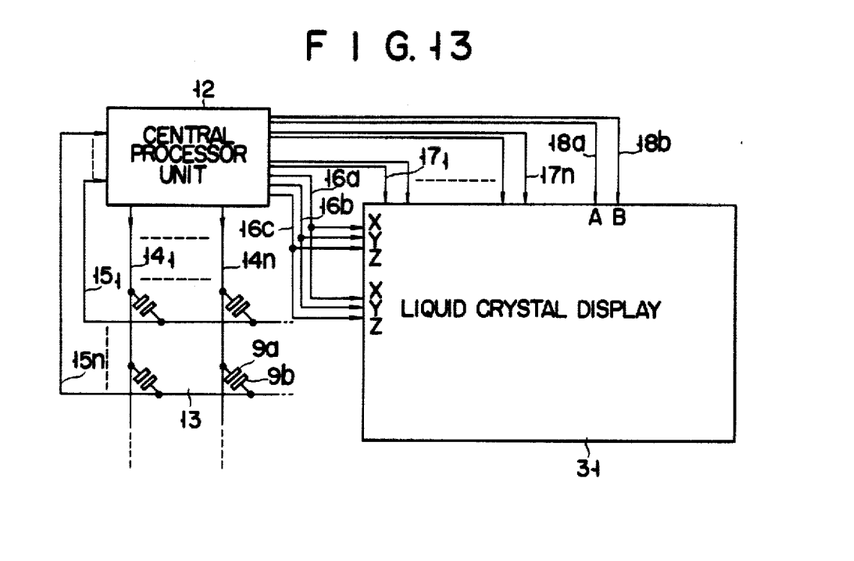
FIG. 13 is a block circuit diagram of the embodiment shown in FIG. 12.

FIG. 13 shows a block diagram of the scientific calculator 1 in the embodiment under discussion. As seen from FIG. 13, the symbols of keys $4_1$ to $4_{22}$, and output data such as keyed-in data and the data of the operation result are displayed by means of a single liquid crystal display unit 31. In the above embodiment, the liquid crystal display unit to display the symbols of the respective input keys and the output data has a size to cover almost the entire area of its upper surface. Only the necessity for the display unit, however, is a single liquid crystal having a size including the display section for displaying the output data and the keyboard section.

Figure 14:
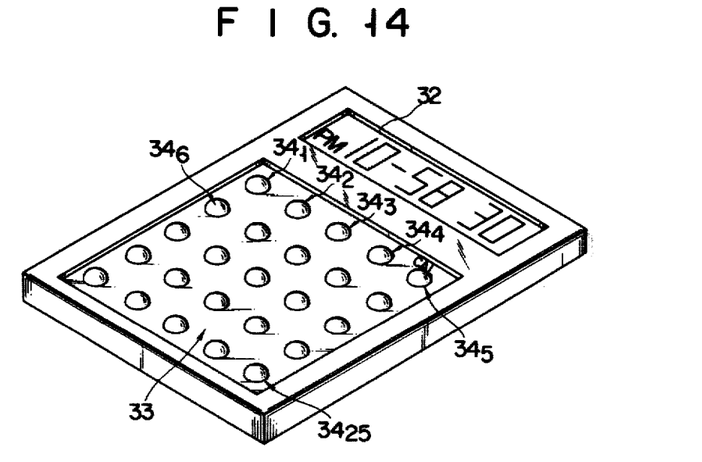
FIG. 14 is a perspective view of the electronic calculator of a further embodiment of the invention.

Another embodiment of the invention will be described with reference to FIG. 14 and FIGS. 15(a) and 15(b). An electronic calculator with a clock function of which the outer appearance is illustrated in FIG. 14, is in a clock display mode. In the figure, reference numeral 32 designates a display window through which the output data such as hour and the result of operation may be seen. The output data is displayed by a liquid crystal display unit for output data display provided within the calculator. A keyboard 33 entirely exposed includes input keys $34_1$ to $34_{25}$ (these keys will be generally referred to as an input key 34) for inputting data. The names of the input keys $34_1$ to $34_{25}$ are displayed by a liquid crystal display unit for key symbol display disposed under the keyboard 33. The input keys $34_1$ to $34_{25}$ are disposed on the surface of the display unit for key symbol display, as in the previous embodiments.

Figure 15A:
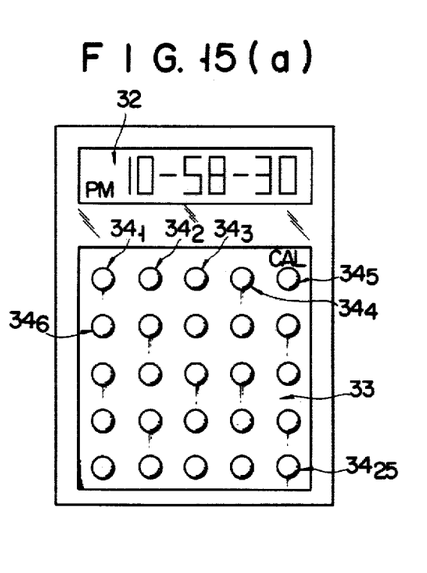
FIGS. 15(a) and 15(b) are diagram useful in explaining the embodiment shown in FIG. 14.
Figure 15B:
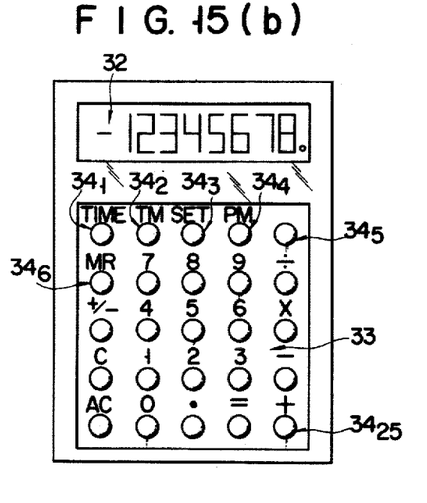

In operation, the calculator is in the clock mode, and displays by the display section 32 hour display "PM10-58-30" representing P.M. 10 hours, 58 minutes, and 30 seconds, as shown in FIG. 15(a). In the keyboard 33, "CAL" representing the symbol of the input key $34_5$ alone is displayed by the liquid crystal display unit for the key symbol display. The input $34_5$ is used to set a calculation mode. The remaining keys $34_1$ to $34_4$ and $34_6$ to $34_{25}$ are not displayed. When the key $34_5$ is operated to set the device in the calculation mode, the key symbols are displayed, as shown in FIG. 15 (b); "TIME" representing the input key $34_1$ for setting the clock mode, "TM", "SET", and "PM" for the input keys $34_2$ to $34_4$ for hour setting, and "1", "2" ..., "x" and "-" for the input keys $34_6$ to $34_{25}$ used for operations. In the clock mode, the "CAL" of the input key $34_5$ is not displayed. The display unit 32 for the output data display does not display the hour but displays the entry data and the operation result data in accordance with a given key operation. When the input key $34_1$ for setting the clock mode is actuated, the display of the display unit for key symbol display is as shown in the display state in FIG. 15(a).

When the calculator of this type is used as a clock, only the symbol of the input key $34_5$ to set the calculation mode is displayed. To use the calculator as a calculator, the input key $34_5$ is depressed and the input keys $34_1$, $34_4$, and $34_6$ to $34_{25}$ and not the input key $34_5$ are displayed.

In the above embodiment, the individual liquid crystal display units are used for displaying the output data and the key symbols. However, a single liquid crystal display device may be used for the display of both the data. Another display unit such as an electronic display may be used in place of the liquid crystal display unit. In addition to the electronic calculator with the clock function, the invention is applicable for other suitable electronic calculators with multi-function. For example, the invention is applicable for an electronic calculator with a radio. In this case, when it is used in radio receiving mode, only the key necessary for selecting a specific station may be displayed. Many other changes and modifications of the invention are allowable within the scope of the invention.

What is claimed is:

1. An electrical apparatus for displaying a plurality of key symbols on a single passive display comprising:
   keyboard means including a first input key group comprised of a plurality of input keys for selectively inputting at least numeral data and function data, each of the input keys of the first input key group having at least two key symbols representing numerals and/or functions associated therewith; and a second input key group comprised of input keys for causing one of said at least two key symbols corresponding to each of the input keys of the first input key group to be selectively displayed;
   a single passive display means disposed under said keyboard means to selectively display one of said at least two key symbols for each of the input keys of the first input key group, said single passive display means including two electrode substrates (19a, 19b) stacked one over the other, electrodes (21, 22, 23, 25) provided respectively on said substrates and between which a liquid layer is sealed, one of said electrode substrates including electrodes (21, 22 and 23) provided on those areas of said one substrate corresponding to said keys of said first input key group to represent at least two key symbols for each key of said first input key group;
   central processing unit means electrically connected between said keyboard means and said single passive display means to perform a predetermined calculation based on the numeral data and function data which are inputted by the operation of the keys of said first input key group, and for causing one respective key symbol to be displayed on said single passive display means for each key of said first input key group as a function of the operation of input keys of said second input key group; and
   output means connected to said central processing unit means to display a result of said calculation performed by said central processing unit means.

2. The apparatus of claim 1, wherein said input keys of said second input key group comprise two keys ($4_1$, $4_2$) which are selectively operated to selectively display said key symbols; and the electrodes provided to display at least two key symbols for each input key of said first input key group in said single passive display means are three (21, 22, 23) in number per one input key of said first input key group.

3. The apparatus of claim 1, wherein said output means comprises a liquid crystal display which, together with said single passive display means, constitutes a single liquid crystal display unit.

4. The apparatus of claim 1, wherein said single passive display means has an area substantially the same as that of said keyboard means.

5. The apparatus of claim 4, wherein said keyboard means includes an ON key for inputting electric power from a power source; and an OFF key for interrupting said electric power, said ON and OFF keys being in addition to said first and second input key groups.

6. The appartus of claim 1, wherein:
   each of said input keys of said keyboard means comprises a section of a resilient, transparent synthetic resin sheet, a movable contact formed at the center of respective sections of an inner side of the transparent synthetic resin sheet and a pair of fixed contacts disposed opposite to said movable contact with a spacing left therebetween;
   said single passive display means further comprising a liquid crystal cell and a pair of upper and lower polarizers (7b, 7c) sandwiching the liquid crystal cell therebetween, said upper polarizer (7b) having a plurality of windows associated with a corresponding number of input keys, a pair of fixed contacts being provided on that portion of the liquid crystal cell which corresponds to each window of said upper polarizer.

7. The apparatus of claim 6, wherein each of said sections of said transparent synthetic resin sheet comprises a substantially semicircular projecting portion provided thereon.

* * * * *